Dec. 4, 1956 R. W. HUTTON ET AL 2,773,128

CROSSBAR-SWITCH CONNECTOR SYSTEM

Filed Feb. 28, 1955 4 Sheets-Sheet 1

Dec. 4, 1956 R. W. HUTTON ET AL 2,773,128
CROSSBAR-SWITCH CONNECTOR SYSTEM
Filed Feb. 28, 1955 4 Sheets-Sheet 2
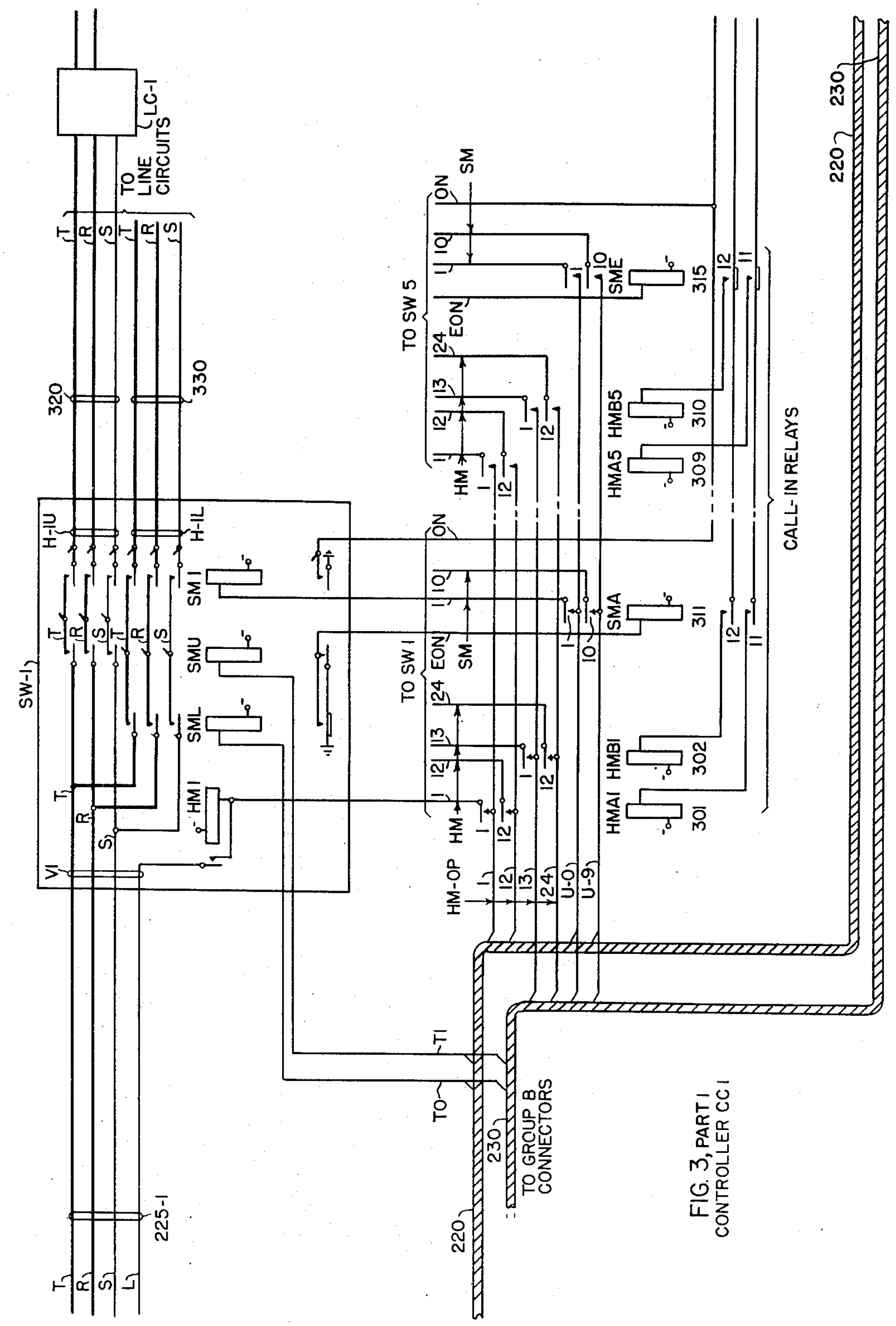
FIG. 3, PART I CONTROLLER CC I Dec. 4, 1956 R. W. HUTTON ET AL 2,773,128
CROSSBAR-SWITCH CONNECTOR SYSTEM
Filed Feb. 28, 1955 4 Sheets-Sheet 3
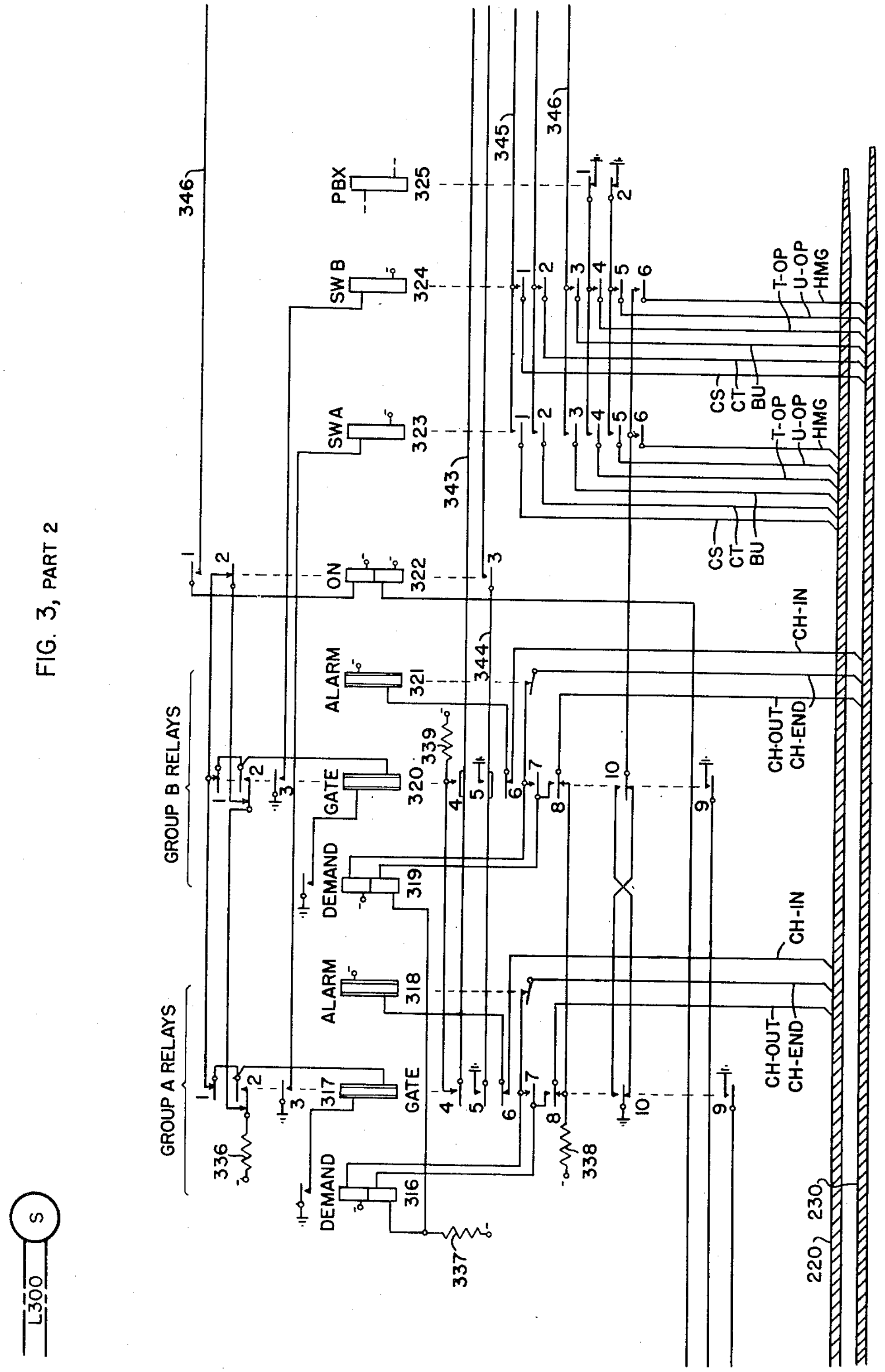
FIG. 3, PART 2

CROSSBAR-SWITCH CONNECTOR SYSTEM
Filed Feb. 28, 1955 4 Sheets-Sheet 4
FIG 3, PART 3
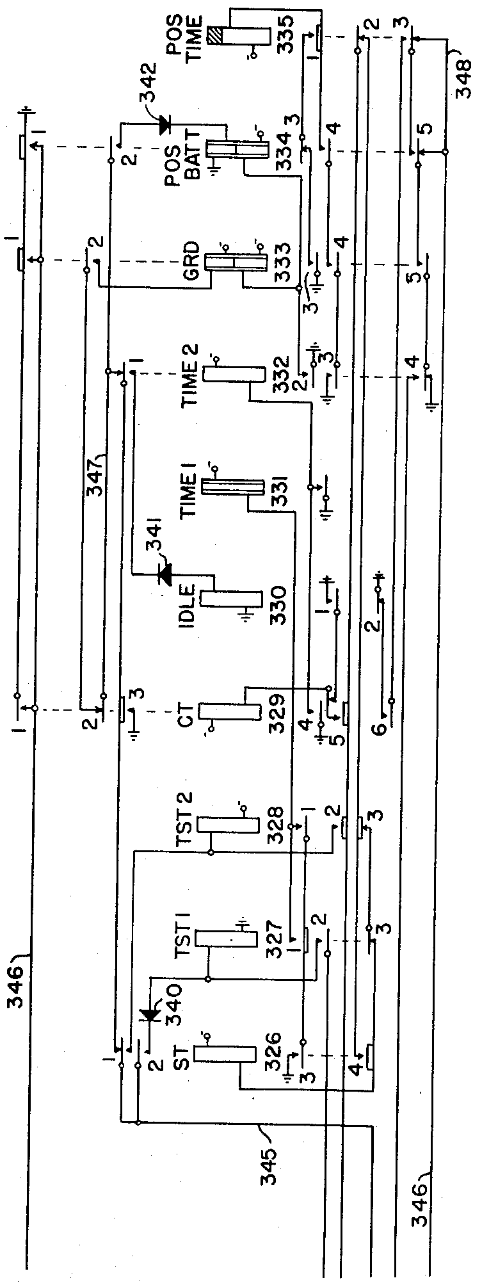

2,773,128

CROSSBAR-SWITCH CONNECTOR SYSTEM

Robert W. Hutton and Edward J. Leonard, Chicago, Ill., assignors to International Telephone and Telegraph Corporation, New York, N. Y., a corporation of Maryland Application February 28, 1955, Serial No. 490,892

6 Claims. (Cl. 179—22)

This invention relates generally to a crossbar-switch connector system but is concerned more particularly with a connector system of that type wherein the trunks incoming to the final or connector stage are given direct-access, as distinct from link-access, to called telephone lines. Its principal object is to provide a new and improved switchboard arrangement of standardized crossbar switches to comprise economical groups of connector switches which may be mounted in frames requiring a minimum of floor space, together wtih new and improved controllers for the respective groups of switches.

In direct-access crossbar connector systems, as shown for example in the United States patent application of R. W. Hutton et al., for a Multi-Group Direct-Access Crossbar Telephone Switching System, Serial No. 359,761, filed June 5, 1953, it is common practice to employ a group of five standardized crossbar switches for each 100-line group of lines. In the cited application, a group of twenty connector relay units connected in common to the verticals of all five switches has access to 100 lines, twenty lines served by the horizontals of each of the five switches. Such an arrangement of crossbar switches for direct-access systems has been used satisfactorily in exchanges having ample floor space but due to the large number of crossbar-switch groups required, has not been considered feasible in exchanges wherein floor space is at a premium.

According to the invention, advantage is taken of the known techniques of increasing the capacity of standardized crossbar switches by using a group of divided, or two-section switches which give access to twice as many connecting paths as an equal number of individual switches. With divided switches being employed and with corresponding sections of the five switches being connected in common, to serve a separate 100-line group of lines, each section of a two-section switch can replace an entire switch of the cited application.

Further, with five crossbar switches serving two 100-line groups, it is not feasible to provide a separate controller for each 100-line group, as a divided switch has but one set of selecting apparatus and interaction between two controllers would ordinarily result on overlapping calls from separate 100-line groups served by the same switch. Accordingly, one controller, common to the two 100-line groups served by the same switch, is provided with arrangements for handling calls to the separate 100-line groups on a one-at-a-time basis.

The above-mentioned and other features and objects of this invention and the manner of attaining them will become more apparent and the invention itself will be best understood, by reference to the following description of an embodiment of the invention taken in conjunction with the accompanying drawings comprising Figs. 1 to 3, wherein:

Fig. 3, parts 1 to 3, shows in circuit diagram the essential details of the controller and two-section switches of Fig. 1.

*General operation*

Figures 1, 2:
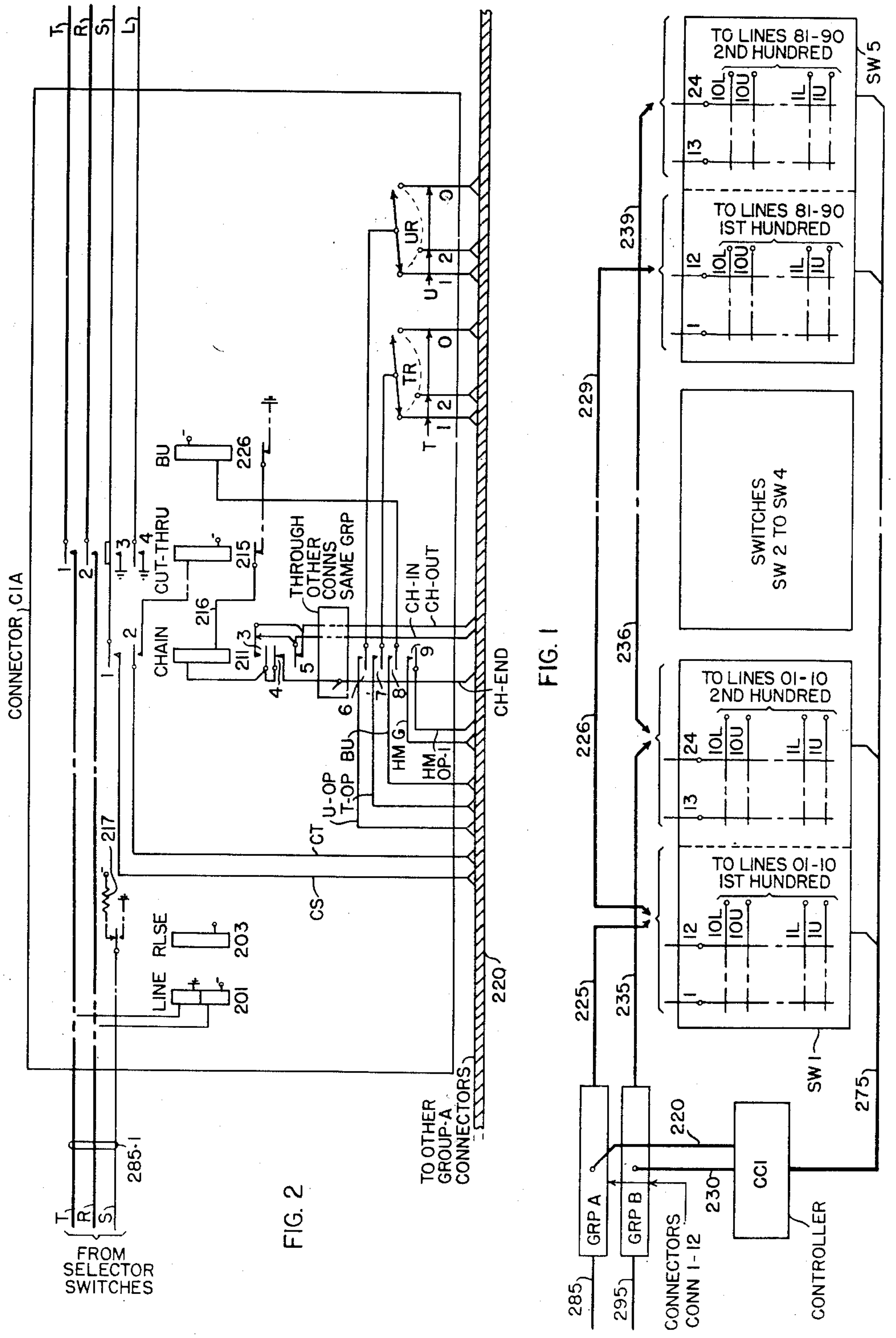
Fig. 1 shows diagrammatically the two-section switches and the associated apparatus serving two 100-line groups of lines.
Fig. 2 shows in partial circuit diagram, the connector relay unit of Fig. 1.

Referring now to Fig. 1 of the drawings, the general operation of the connector system in extending connections to called lines will be given.

Fig. 1 shows a 200-line connector frame comprising twenty-four connector relay units, CONN 1–12 of group A and CONN 1–12 of group B, five connector switches SW1 to SW5, and one controller CC1. The 12 connectors in each of the groups A and B are associated with preceding selector switches (not shown) in the usual manner and calls to lines reach the associated connector frame over conductors in cables 285 or 295 depending on the dialing of the hundreds digit of the desired line. The switches SW1 to SW5 are shown arranged side-by-side but may be mounted one above the other on a five or a ten switch frame, such frames accordingly serving two or four 100-line groups.

The connector switch frame in response to a calling condition received over any trunk in cable group 285 or 295, followed by the dialing of the desired line in the called hundreds group, functions to (1) identify the called line; (2) exercise control over the switches to extend a connection from the calling trunk to such line; and (3) test the line and transmit the testing information to the calling connector.

The switches SW1 to SW5 of which only the first and last are shown in partial detail, are similar to those disclosed in United States Patent No. 2,577,067 issued December 4, 1951, to R. P. Arthur for a Crossbar Switch. In such a switch it is well-known that severing the horizontal multiple between any two adjacent verticals provides two similar groups of horizontal multiples with each group having the original number of termination points, and being accessible by a portion of the original number of verticals, the number of verticals having access to each horizontal multiple group being determined by the adjacent verticals selected as a point for severing the horizontal multiple.

In this disclosure the horizontal multiple of a 25 x 20 switch (25 verticals and 20 horizontals) is severed between the twelfth and thirteenth verticals, thereby effectively providing two 12 x 20 sections (12 verticals and 20 horizontals). In direct-access connector systems, wherein the lines are terminated on the horizontals and the trunks or connector relay units are terminated on the verticals, the use of the 25 x 20 switch with the multiple severed as above noted, provides termination points for forty lines and twenty-four trunks, each such section serving twenty lines and twelve trunks.

Since the number of lines (40) served by a two-section switch is not a multiple of the number of lines in a 100-line group, in order for 5 switches to serve two 100-line groups of lines, portions of the lines of two separate 100-line groups must be terminated on the same switch, resulting in additional control problems arising from controlling respective sections of the same switch. Accordingly, rather than assigning the lines of a 100-line group to five sections (each section terminating 20 lines) of two and one-half switches, it has been chosen to assign the lines of one 100-line group to the first section (section A, verticals 1–12) of all five switches and the lines of another 100-line group to the second section (section B, verticals 13–24) of such switches. In this manner, corresponding switch sections of the five switches each serve a portion of the lines of the same 100-line group.

As is well known in selector systems, the dialing of the hundreds digit directs the call to an idle connector of the hundreds group containing the called line. Accordingly, a call to the first 100-line group reaches an idle connector in group A, such connector group being associated with the first 100-line group of lines by conductors in cable group 285, and calls to lines in the second 100-line group reach an idle connector in group B over conductors in cable group 295.

Responsive to a connection being extended to an idle connector from a preceding selector stage, the tens and units digits of the directory number are dialed, and the connector controller CC1 is thereafter called-in over conductors in cable 220 or 230, and is individualized with the calling connector. The controller responds to the dialed digit information, and over conductors in cable 275, controls switches SW1 to SW5 to extend the connection to the called line.

When a connector in group A is seized by a preceding selector stage responsive to the dialing of the hundreds digit of the desired line, and when the tens and units digits of the directory number of the desired line is thereafter registered in such connector, controller CC1 becomes individualized with the calling connector A and responds to the tens and units marks registered therein to identify the switch and switch horizontal serving the called line, operates the select magnets to select the called line, and operates the hold magnet associated with the vertical terminating the individualized connector to extend a connection from the calling connector to a called line. The detailed operation of controller CC1 will be described hereinafter with reference to Fig. 3.

When two connectors in separate groups attempt to become individualized with controller CC1 at the same time, arrangements are provided to give one connector or the other preference to maintain the operation of the controller on a one-at-a-time basis.

Upon completion of a connection to a called line from a calling connector, controller CC1 clears out and is returned to common use.

*Detailed description*

Referring now to Fig. 2 of the drawings, a detailed description of the operation of a connector C1A will be given.

The operation of connector C1A is generally similar to that of connector 1600 disclosed in the noted Hutton et al. application. Connector C1A is seized by the preceding selector stage (not shown) responsive to the dialing of the hundreds digit indexing the 100-line group of lines served by connectors of group A, subject to idle-indicating battery potential appearing on the sleeve conductor S of trunk 285–1, whereupon the calling loop across the tip and ring conductors T and R is extended to the battery and ground connected windings of the line relay 201.

Line relay 201 operates and operates release relay 203 in the usual manner, whereupon the idle-indicating battery potential is removed and ground potential substituted therefor to hold the preceding connection.

Responsive to the dialing of the tens and units digit of the desired directory number, operations occur in connector C1A to cause the tens register TR to position itself on the tens digit wire T1 to T0 in accordance with the tens digit dialed and to cause the units register UR to position itself on the units wires U1 to U0 corresponding to the units digit dialed, such operation being well-known. Following the completion of the dialing of the tens and units digit, an operate ground is extended to wire 216 of chain relay 211 which, in the event the controller CC1 is idle, causes connector C1A to become individualized with the controller to the exclusion of the remaining connectors in the same group and to the exclusion of the connectors in the other group.

Contacts 1 of chain relay 211 connect the sleeve conductor S of the called line to the called sleeve conductor CS extending to the controller; its contacts 2 prepare an operate circuit for the cut-through relay 215 in order to complete the connection from the calling line to the called line; its contacts 3, 4, and 5 function to perform the noted individualization with the controller to the exclusion of the remaining connectors in the same connecting group; its contacts 6 and 7 connect the units operate wire U–OP and tens operate wire T–OP to the units and tens digit wires corresponding to the setting of the registers; its make contacts 8 prepare an operate circuit for busy relay 226 in the event that the called line is busy; and its make contacts 9 connect the hold-magnet ground conductor HMG, which is common to all the connectors in the same group, to hold magnet operate wire HMOP–1, which is individual to the connector C1A.

As will hereinafter be described in detail, controller CC1 completes a connection through an associated switch and tests the called line. Upon finding such line idle, it extends ground potential to conductor CT to operate the cut-through relay 215 to complete the connection or to ground busy conductor BU to operate busy relay 226 if the called line is busy, such operations being well-known in connector systems.

Responsive to the usual signalling of a called idle line and the normal cut-through operations, the calling line is connected to the called line and the concerned parties may converse.

Responsive to the noted completion of the extension of a connection from a calling line to a called line, ground is removed from wire 216 by contacts 5 of cut-through relay 215 and controller CC1 is disassociated from connector C1A and returned to common use. In the event the called line was busy, ground was removed from wire 216 by contacts on busy relay 226 and the controller was released thereafter.

Disconnect by the calling and called parties restores all operated relays to normal and connector C1A is again marked idle by the reappearance of battery on the sleeve conductor S of trunk 285–1.

Referring now to Fig. 3, parts 1 to 3 of the drawings, a detailed description of the operation of controller CC1 in extending a connection from a calling connector C1A to an idle called line L300, served by the first upper horizontal of section A of switch SW1, will now be given.

The 35 relays (301 to 335) of controller CC1 have principal functions assigned thereto as follows:

Relays 301 to 310 (hold-magnet call-in relays) are grouped into five groups of two relays each with each group being associated with a separate crossbar switch and functioning to control the operate leads of the hold magnets therein, the relays of each group corresponding respectively to the sections of the associated switch, the A relays corresponding to the section containing verticals 1 to 12 and the B relays corresponding to the section containing verticals 13–24;

Relays 311 to 315 (select-magnet call-in relays) are associated respectively with the five switches SW1 to SW5 and when operated, call-in to the connector controller CC1, the operate windings of the select magnets;

Relays 316 to 321 (group-chain relays) are grouped into two groups of three relays each with each group of three relays being associated with a separate group of connector relay units. When operated the concerned group individualizes the controller with the associated group of connector units. The operation of the individual relays in each group will be described in detail hereinafter;

Relay 332 (off-normal relay) operates responsive to the operation of any principal select magnet and starts the line-testing operation to determine the busy, idle, or availability condition of the called line;

Relays 323 and 324 (switch-control relays) are associated with the respective groups of connector relay units and function to connect the common control wires of their associated group of connectors to the controller;

Relay 325 (P. B. X relay) is shown for reference purposes only to illustrate the disabling of controller-operation responsive to the digit information received being indicative of a P. B. X call;

Relay 326 (start relay) operates to start the testing of the called line;

Relay 327 (Test-1 relay) operates if the called line is idle to cause operations to occur in the connector to complete the calling connection to the called line;

Relay 328 (Test-2 relay) operates if the called line is busy or unobtainable to control the individualized connector in accordance with the condition of the called line;

Relay 329 (cut-through relay) operates when the called line is idle and grounds the sleeve conductor S of the called line to operate the cutoff relay in the called line circuit and to terminate the testing operation;

Relay 330 (idle) operates if the called line is idle to control the individualized connector to complete the connection;

Relays 331 and 332 (time relays) operate to introduce time-delays to distinguish between busy lines and unobtainable lines on intercept service;

Relay 333 (ground relay) operates and locks if ground or positive battery appears on the sleeve of the called line and prepares to operate the busy relay in the calling connector;

Relay 334 (positive-battery relay) operates and locks if positive battery appears on the sleeve lead of the called line; and Relay 335 (positive-time relay) operates to indicate an unobtainable called line, such condition arising when the called line is on intercept.

Responsive to a calling condition on trunk 285–1 by the extension of the calling loop through the preceding selector stage, the calling subscriber dials the tens and units digits corresponding to the desired line in the already-selected hundreds group, such digits being recorded on the tens and units registers TR and UR, as previously noted.

Following such dialing, connector C1A, becomes individualized with connector controller C1A in the following manner: Ground through break contacts on relays 215 and 226 of connector C1A appears on wire 216 (extending to one side of the winding of chain relay 211), is extended through the winding of relay 211, and through its break contacts 4 to the chain-end wire CH–END. This ground is further extended to battery through the upper winding of demand relay 316 of controller CC1, through normally-closed contacts of alarm relay 318 and chain-end conductor CH–END of cable 220. The resistance of the chain relay is such that it does not operate in series with demand relay 316, but the resulting current flow through the demand relay in series with the chain relay is sufficient to operate the demand relay. Relay 316 operates and at its make contacts prepares an operate circuit for gate relay 317.

Assuming gate relays 317 and 320 are restored, battery from current-limiting resistor 336 is extended through break contacts 2 of relays 317, 320, 322 and through break contacts 1 of relays 317 and 320 to one side of the winding of each of such relays.

Gate relay 317 operates as it is the only gate relay with ground appearing on the other side of its winding, and it locks operated through its make contacts 2. At its break contacts 1 and 2, it disables the operate circuit of gate relay 320 of the group B relays; its make contacts 3 extend ground potential to the battery-connected winding of switch A relay 323; its make contacts 4 extend battery potential through current-limiting resistor 339 to locking wire 343 in preparation for locking test relay 327 operated; its make contacts 5 ground wire 344 in preparation for operating start relay 326; its break contacts 6 open the operate circuit of alarm relay 318; its make contacts 7, together with make contacts 8, connect the upper and lower winding of demand relay 316 in parallel with the chain-out wire CH–OUT; its contacts 9 prepare an operate circuit for a hold magnet call-in relay; and its contacts 10 ground the hold-magnet ground wire HMG. At such time, before slow-releasing alarm relay 318 restores, the upper and lower windings of demand relay 316 is connected in parallel, as noted, and the current flow over the chain-end conductor CH–END is increased to a value which causes chain relay 211 of connector C1A to operate.

Chain relay 211, upon operating, locks operated to the chain-out wire CH–OUT through its make contacts 3, and at its break contacts 3, 4, and 5, prevents the chain relays of the remaining connectors in the same connector group from becoming individualized with the controller at the same time.

The locking circuit of relay 211 includes chain-out conductor CH–OUT of cable 220, make contacts 8 of gate relay 317, the lower winding of demand relay 316 and resistor 337 in parallel with the upper winding of relay 316.

In the event, a connector of group B attempts to seize the controller at the same time, the associated demand relay (relay 319) operates, but the associated gate relay (relay 320) fails to operate as its operate circuit is open at break contacts 2 of relay 317. However, when the demand and gate relays of the group A relays are restored, group B relays have controller preference as their associated demand relay 319 is already operated and the associated gate relay 320 then operates before the gate relay associated with the last-used demand relay can operate. This arrangement causes controller CC1 to be associated with the two groups of connectors alternately if calls from two different connector groups are overlappingly present.

As previously noted, responsive to the operation of chain relay 211, switch relay 323 operates and its make contacts 4 and 5 extend ground potential from break contacts 1 and 2 of P. B. X relay 325 to the associated tens and units operate wires T–OP and U–OP, these grounds being extended through respective contacts 7 and 6 of chain relay 211 of connector C1A to the brushes on the respective registers TR and UR.

Ground appearing on such units operate and tens operate wires is extended through associated digit register contacts to energize the associated digit wires T and U corresponding to the setting of such registers.

For purposes of illustration, assuming the tens digit 1 and the units digit 0 to be dialed in connector C1A, connector C1A being seized responsive to the dialing in the preceding stage of the hundreds digit of the lines served by connector C1A, ground appears on tens wire T1 and units wire U0 and is extended over conductors in cable 220 to the switch SW1 corresponding to the digits dialed, and to controller CC1.

As is illustrated in Fig. 1, switch SW1 is associated with twenty lines of each of two 100-line groups, such 20 lines corresponding to the tens digit 0 and 1, the tens digit 0 corresponding to the ten lines associated with the lower horizontals on switch SW1 and the tens digit 1 being associated with the ten upper horizontals of switch SW1. Therefore, responsive to the dialing of the tens digit 1, the ground appearing on the tens wire T1 is extended to the battery-connected winding of the upper auxiliary select magnet SMU, operating it to select the upper sets of horizontals corresponding to the group of ten lines containing the called line.

Responsive to the operation of the auxiliary select magnet SMU, in addition to mechanically selecting the group of ten horizontals serving the called line, off-normal contacts thereon ground extension off-normal conductor EON to energize the winding of select magnet call-in relay SMA, such relay being individual to switch SW1.

Select magnet call-in relay SMA operates and at its make contacts 1 to 10, extend the 10 units wires U0 to U9 to respectively corresponding principal select magnets SM1 to SM10 of the selected switch SW1, and at its make contacts 11 and 12 complete an operate circuit for one or the other of the hold magnet call-in relays HMA1 or HMB1, such call-in relays being individual to switch SW1.

Ground appearing on the selected units wire U0 is extended through the associated contacts 1 of select magnet call-in relay SMA as noted, and operate the principal select magnet SM1 of switch SW1. At the same time, ground from make contacts 9 of operated gate relay 317 of the group A relays is extended through contacts 11 of relay SMA to operate hold magnet call-in relay HMA1, such relay corresponding to the first section of the switch SW1. As previously noted, ground from make contacts 10 of gate relay 317 is extended through break contacts 10 of gate relay 320 and through make contacts 6 of relay 323 to the hold-magnet ground conductor HMG. This ground is further extended through make contacts 9 of the chain relay 211 of the individualized connector and appears on the hold-magnet operate wire HM–OP–1 corresponding to the vertical location of such connector. The ground on the hold magnet operate wire HM–OP–1 is extended through make contacts 1 of the operated hold-magnet call-in relay HMA1 to the battery-connected winding of hold-magnet HM1.

Responsive to the operation of the principal select magnet SM1, off-normal contacts ground the off-normal wire ON to extend ground potential to the battery-connected winding of the off-normal relay ON.

Hold magnet HM1 operates and through its off-normal contacts closes its locking circuit and operates the switch crosspoints corresponding to the intersection of the associated vertical and the selected horizontal. The vertical path corresponds to the calling connector and the horizontal path corresponds to the ten-line group containing the called line and the called line therein. The tip, ring, and sleeve conductors of the calling connector are thereby connected to respective conductors of the called line. At such time, the potential appearing on the sleeve conductor S of the called line, also appearing on the sleeve conductor S of connector C1A is extended through make contacts 1 of chain relay 211, over the called-sleeve conductor CS of cable 220, and through contacts 1 of operated switch relay SWA to wire 345, extending to contacts on start relay 326.

Responsive to the hereinbefore noted grounding of off-normal wire ON, relay ON operates and at its contacts 3 extends ground potential from wire 344 to the battery-connected winding of start relay 326 through break contacts 2 of relay 335 and break contacts 3 of relays 328 and 327.

Start relay 326 operates and its make contacts 2 connect conductor 345 to the ground-connected winding of test-relay 327 through rectifier 340 and its contacts 1 connect wire 345 to the battery-connected winding of test relay 328. Additionally, make contacts 4 of start relay 326 locks itself operated independent of either of the test relay 327 or 328.

The controller CC1 thereupon tests the sleeve conductor of the called line to determine its availability for connection to the calling line.

Assuming the called line L300 to be idle, resistance negative battery from the cutoff relay (not shown) of line circuit LC–1 of the called line is present on the sleeve conductor S and such negative resistance battery is extended through make contacts 2 of start relay 326 and rectifier 340 to the ground-connected winding of test relay 327. This potential also appears on the winding of relay 328, such relay then becoming short-circuited and consequently inoperative.

Test relay 327 operates and locks operated through its make contacts 2 to resistance negative battery on conductor 343 from current-limiting resistor 339. Its make contacts 1 extend ground potential from make contacts 3 of start relay 326 to the battery-connected winding of time-1 relay 331.

Time relay 331 operates and extends ground potential to the battery-connected winding of time-2 relay 332.

Time-2 relay 332 operates and at its break-make contacts 1 opens the locking circuit of relays 333 and 334; its make contacts 2 extend ground potential to the battery-connected lower windings of such relays; its make contacts 3 prepare an operate path for a positive-time relay 335; and its make contacts 4 prepare a circuit for grounding the cut-through CT extending to the cut-through relay 215 of the calling connector C1A.

Ground relay 333 operates and its make contacts 1 lock off-normal relay 322 operated; its make contacts 3 prepare a locking circuit for relay 335; and its make contacts 5 aid in the preparation of a circuit for grounding the cut-through lead CT.

Start relay 326 restores and its break contacts 1 now extend the negative resistance battery on conductor 345 through make contacts 1 of time-2 relay 332 and rectifier 341 to the ground-connected winding of idle relay 330. At the same time, its make contacts 3 open-circuit time relay 331.

Idle relay 330 operates from the battery on the sleeve; its make contacts 1 extend ground potential to the battery-connected winding of cut-through relay 329; and its break contacts 2 remove the ground from the cut-through conductor CT to prevent premature operation of the cut-through relay of the connector.

Cut-through relay 329 operates and locks operated through its make contacts 5 to the ground on conductor 344; its contacts 1 apply an additional locking ground to conductor 346 to maintain the off-normal relay ON operated; and its make contacts 3 restore idle relay 330 to short-circuit such relay by grounding the called sleeve conductor CS.

The ground appearing on the called sleeve lead CS from make contacts 3 of cut-through relay 329 operates the cutoff relay (not shown) of line circuit LC–1 associated with the called line to prevent the answering line loop from starting line-finding action.

Time-1 relay 331 restores after a slight delay, such delay providing time for short-circuiting of the idle relay, if operated, and for completing control circuits.

Idle relay 330 releases and its make contacts 1 open the operate circuit of cut-through relay 329, and its break contacts 2 extend ground potential to the cut-through lead CT, extending to the connector C1A, through make contacts 6 of cut-through relay 329, make contacts 3 of positive-time relay 335, make contacts 5 of relays 333 and 334, make contacts 4 of time-2 relay 332, and make contacts 2 of switching relay 323.

The ground appearing on the cut-through conductor CT operates cut-through relay 215 of connector C1A, thereby extending the calling connection of the connector through contacts 1 and 2 of the cut-through relay and the closed contacts on switch SW1 to the called line, completing seizure of such line. At such time, the connector controller having completed its function is released and made available for use on a call from another connector.

Responsive to the operation of the cut-through relay 215 of connector C1A, ground is removed from wire 216 and the chain relay is restored together with demand relay 316 of controller CC1. Shortly thereafter, gate relay 317 is restored and at its contacts 3, restores the switch relay 323 and the operated call-in relays. The principal and auxiliary select magnets are then restored, leaving the connection completed through switch SW1 by operated hold magnet HM1, which is locked operated to the ground on lock lead L, such lead being grounded at contacts 4 of cut-through relay 215 of connector C1A. Shortly thereafter, test relay 327, cut-through relay 329, time-2 relay 332, positive-battery relay 334, ground relay 333, positive-time relay 335, and off-normal relay 322 restore, completely returning the controller to common use.

During such clearout time, another call may operate the associated demand relay again but the concerned gate relay cannot operate until the restoration of the off-normal relay 322, the operating circuit of the gate relays being controlled thereby.

At such time, connector C1A signals the called party in the usual way and conversation may take place,, controller CC1 being completely disassociated from the connection.

Assuming the called line to be busy instead of idle, as described, ground potential on the sleeve conductor S of the line circuit associated with the called line appears on the called-sleeve conductor CS which through make contacts 1 of switch relay 323 of controller CC1 is extended to the windings of test relays 327 and 328.

Test relay 328 operates and locks operated through its make contacts 2 to ground on conductor 344 through make contacts 3 of off-normal relay 322. Make contacts 1 of relay 328 extend ground potential to the battery-connected winding of time relay 331, operating it, causing time-2 relay 332 to operate. Time relay 322, at its contacts 2, operates the ground relay 333 and the positive battery 334 as pointed out for an idle-line condition and together with operated relays 333 and 334, operates positive-time relay 335.

With time relays 331 and 332 operated, the ground on the sleeve conductor S of the called busy line short-circuits idle relay 330, preventing the hereinbefore noted grounding of the cut-through conductor CT.

Responsive to the operation of positive-time relay 335, break contacts 2 thereof restore start relay 326 in the manner hereinbefore described, thereby releasing time relays 331 and 332 together with positive-battery relay 334. At such time, test relay 328 and ground relay 333 are locked operated, relay 333 being locked operated through its make contacts 2, break contacts 2 of cut-through relay 329, and break contacts 1 of now restored time relay 332 to the ground appearing on the sleeve conductor of the called busy line. Relay 328 is locked operated to the ground appearing on wire 344.

Ground potential from back contacts 4 of now-restored time relay 332 is extended through make contacts 5 of operated ground relay 333 and through back contacts 5 of restored positive relay 334 to wire 346, from whence it is extended through make contacts 3 of the operated switch relay 323 to the busy conductor BU extending to connector C1A over its associated conductor in cable group 220, such grounded conductor operating busy relay 226 of connector C1A to cause busy tone to be returned to the calling subscriber and the controller to be returned to common use by the removal of ground from the wire 216, in the manner hereinbefore described. Shortly thereafter all operated relays are restored by the restoration of the demand and gate relays of the group A relays.

In the event the called line originating a call was being metered at the time the line was being tested, a pulse of positive battery appearing on the called-sleeve conductor CS would maintain the positive-battery relay 334 operated for a short interval of time, such holding circuit including its make contacts 2 and associated rectifier 342. On completion of the metering pulse, positive-battery relay 334 would restore and ground the busy conductor BU, as previously described.

Assuming the called line is unassigned, positive battery potential is present on the sleeve conductor S of the unassigned line terminals, such potential being applied by jumpers, not shown.

This positive battery for unassigned line terminals appearing on the sleeve conductor of the called line operates test-2 relay 328 in a manner similar to its operation responsive to the calling of a busy line. Relay 328 operates time relays 331 and 332, which thereupon operate ground relay 333 and positive battery relay 334, all in a manner previously described. Shortly thereafter, positive-time relay 335 operates to restore start relay 326 and consequently time relays 331 and 332. Responsive to the restoration of relay 332 after the time delay interval, positive time relay 335 restores. At such time, test-1 relay 327 is locked operated to ground on conductor 344, ground relay 333 is locked operated through its upper winding to positive-battery potential on conductor 347 from the called sleeve conductor CS, and positive-battery relay 334 is locked operated through its upper winding to positive-battery potential on conductor 347.

Ground from break contacts 4 of time-2 relay is extended through make contacts 5 of relays 333 and 334 and through break contacts 3 of now-restored positive-time relay 335 to conductor 348 extending to the busy conductor BU.

While break contacts 3 of positive-time relay 335 and break contacts 5 of positive relay 334 are multipled together, it is to be noted that responsive to receiving a positive-battery potential on the called sleeve, conductor 348 may be separated from the busy conductor BU and connected to connector C1A as a separate conductor for use as a number-unavailable wire which functions to control a special relay in the connector to provide a distinctive tone indicating that an unassigned line has been called. However, in this disclosure, ground on wire 348 operates the busy relay in connector C1A in a manner previously described.

After such number-unavailable tone or busy-tone is returned to the calling subscriber, responsive to the operation of the busy relay or the special number-unavailable relay in the connector, the chain circuit is opened, as hereinbefore noted, and the controller CC1 is returned to common use again.

In the event the number called is associated with a group of line terminals assigned to lines of a P. B. X group, operations occur to operate P. B. X relay 325 of Fig. 3, part 2 of controller CC1, such operation not being disclosed in this application. At its break contacts 1 and 2, relay 325 opens the tens operate wire T–OP and the units operate wire U–OP to permit a P. B. X control circuit (not shown) to come into operation to direct a call to a desired line in the called P. B. X group.

Responsive to the operation of such P. B. X relay 325 and the consequent removal of ground from the units and tens operate conductors T–OP and U–OP, any operated select magnets and call-in relays in the controller circuit are restored and then reset according to control received from the noted P. B. X control circuit in order to direct the call to the called P. B. X group.

While we have described the above principles of our invention in connection with specific apparatus, it is to be clearly understood that this description is made only by way of example and not as a limitation to the scope of our invention.

We claim:

1. In a switching system for interconnecting separately seizable calling trunks with lines called thereover, a crossbar switch including two switching sections and having select magnets common to both sections, each section including a set of horizontal multiples individually selectable by the common select magnets, each section further including a separate set of hold magnets and an associated set of vertical multiples intersecting the horizontal multiples of the section, each section further including crosspoint means for connecting any horizontal multiple of the section to any vertical multiple thereof under the joint control of the hold magnets of the section and the common select magnets, a separate group of the lines and a separate group of the calling trunks associated with each section, with the lines of any section connected to respective multiples of one said set of multiples of the section, and with the associated trunks connected to respective multiples of the other set of multiples of the section, whereby the crosspoint means of the last-said section can interconnect any associated trunk with any associated line, register means and means controlled over any seized trunk for setting it to indicate the line identity of any desired called one of the lines in the group of lines associated with one switch section and to indicate the line identity of a respectively corresponding line in the group of lines associated with the other switch section, a controller common to both switch sections and means for temporarily individualizing it with any trunk over which the said register means has been set, means controlled according to the individualization of the controller with a trunk of one of said trunk groups for indexing one of said groups of lines, and means controlled jointly by the said line-indicating means and group-indexing means for controlling the select magnets of the switch and the hold magnets of the section associated with the individualized trunk to actuate the specific crosspoint means required to connect the individualized trunk to the line called thereover.

2. In a switching system according to claim 1, wherein the said two-section crossbar switch comprises one switch of a group of similar switches each controllable by the said controller and wherein the switches of the group are so interrelated that each switch is similarly associated with the said separate groups of calling trunks and that respective switch sections are similarly associated with separate groups of lines, whereby the crosspoint means of any section of any switch can interconnect any associated trunk with any associated line, means in the said register means for indicating the switch associated with any said desired called line, and means in the controller responsive to the switch location indication for controlling the select magnets of the indicated switch and the hold magnets of the section thereof that corresponds to the individualized trunk to cause the said connection of the individualized trunk to the line called thereover.

3. In an automatic switching system, first and second numerically-distinct groups of calling trunks and respectively corresponding first and second groups of lines, switching apparatus operable to connect calling ones of the trunks to respective called lines in the associated group of lines, register means and means controlled over any calling trunk for setting it to indicate the identity of any desired called one of the lines in an associated group of lines and to indicate the line identity of a respectively corresponding line in the said other group of lines, a controller common to both trunk groups for controlling the switching apparatus, means for temporarily individualizing the controller with any trunk over which the said register means has been set and for indexing one of said groups of lines, and means controlled jointly by the said line-indicating means and the said group-indexing means for controlling the switching apparatus to connect the individualized trunk to the line called thereover.

4. In a switching system according to claim 3, means for establishing an order of preference among the trunk groups for controller individualization with trunks therein, and means for shifting that preference on successive individualizations subject to overlappingly active settings of the registers associated with the said trunk groups.

5. In an automatic switching system, a connector frame for enabling calling trunks to be connected to respective called ones of a group of associated lines, crossbar switches including two sections each having ten horizontal multiples and having a group of intersecting vertical multiples, principal select magnets corresponding respectively to the horizontal multiples and hold magnets corresponding respectively to the vertical multiples, each switch section serving a separate twenty of said lines, the lines comprising pairs connected respectively to the horizontal multiples, whereby each switch serves four ten-line groups of lines, each switch having two auxiliary select magnets corresponding respectively to two ten-line groups of lines of each of its sections, a separate group of the calling trunks for each of said two sections, connected to respective vertical multiples of each switch section of the switches, control means common to the said groups of trunks, means controlled over any trunk for operating said control means in accordance with the switch section containing such trunk and in accordance with the tens and units digit of any desired called line, said control means including means for selecting the switch terminating the called line according to the called tens digit and for operating the one of the auxiliary select magnets thereof which corresponds to such tens digit to select the corresponding ten-line group of lines of each section of the selected switch, the control means further including means for operating the principal select magnet which corresponds to the called units digit to select the corresponding line in each of the two selected ten-line groups, and means controlled according to the section containing the calling trunk for operating the concerned hold magnet of the last-said section of the selected switch to complete a connection to the called one of the selected lines.

6. In a switching system according to claim 5, forties relays associated respectively with the said crossbar switches, twenties relays associated respectively to the sections of the said crossbar switches, means responsive to the operation of either auxiliary select magnet of a switch for operating the associated forties relay, means controlled by the said operated forties relay according to the switch section associated with the calling trunk for operating the twenties relays of such section, and means controlled by the operated twenties relay for operating the hold magnet of the associated switch and concerned switch section which corresponds to the calling trunk.

References Cited in the file of this patent

UNITED STATES PATENTS

| | | |
|---|---|---|
| 2,412,258 | Gillings | Dec. 10, 1946 |
| 2,491,377 | Joel | Dec. 13, 1949 |
| 2,582,959 | Bruce et al. | Jan. 22, 1952 |
| 2,714,728 | Bosevous | Aug. 2, 1955 |